June 3, 1947.  A. J. DONOVAN  2,421,550
METHOD OF COATING TUBULAR GLASS ARTICLES WITH LUMINOUS MATERIAL
Filed March 28, 1942
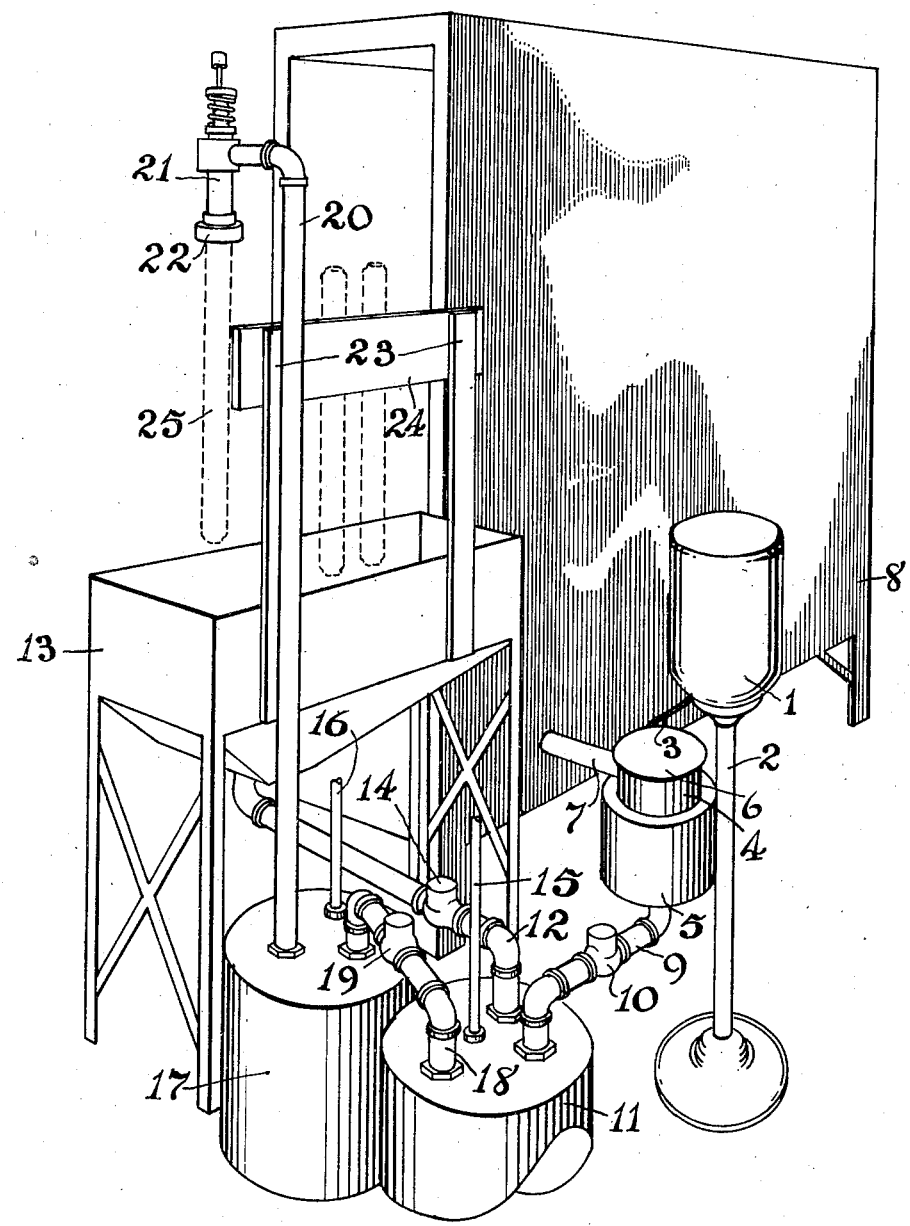
Alfred J. Donovan, INVENTOR.
BY
Lawrence Burns, ATTORNEY Patented June 3, 1947

2,421,550

UNITED STATES PATENT OFFICE 2,421,550

METHOD OF COATING TUBULAR GLASS ARTICLES WITH LUMINOUS MATERIAL

Alfred J. Donovan, Danvers, Mass., assignor to Sylvania Electric Products Inc., a corporation of Massachusetts Application March 28, 1942, Serial No. 436,691

1 Claim. (Cl. 117—97)

This invention relates to the recovery of luminescent material solution drainage and more particularly to a method and means for automatically recovering and reconverting said drainage for immediate reuse.

In the manufacture of fluorescent lamps, the elongated glass tubes have their inside walls coated with a layer of luminescent material. This material is usually applied by causing a solution containing said material to flow along the walls of the tube, for example, in a flushing or a spraying manner. In recovering this solution it has been found that the solvent, in which the nitrocellulose and plasticizer are dissolved to form the vehicle in which the luminescent material is suspended, has a tendency to evaporate. Since this evaporation tends to change the viscosity of the solution and since uniform viscosity is essential to uniform coating and uniform drying, it has been found undesirable to run this drainage directly back into the original solution. To collect this drainage and treat it separately in small batches and then re-introduce it into the batch of original solution protects against this fluctuating viscosity but this method is undesirable because of the several manual operations which it necessitates.

I have, therefore, formulated a method and devised an apparatus for the application of said method whereby the solution drainage is automatically treated as it is drained so that it regains its original viscosity and is directed back and mixed with the original solution. Thus uniform viscosity of the coating solution is attained without the necessity of separately treating quantities of the drainage before returning it for re-use.

The accompanying drawing is a perspective view of an apparatus designed for the salvaging of fluorescent material solution drainage according to my method.

In the drawing, the container 1 is supported by the standard 2 in such a position that the solvent therein may be fed into the filter 4 through the line 3. This filter consists of the outer jacket funnel 5, fine filter screens, and the cover 6. The drainage pipe 7 extends from the tunnel 8 to the filter 4. The line 9 extends from the funnel 5, through the check valve 10, into the crock 11. Line 12 runs into the crock 11, through the check valve 14, from the drainage tank 13. The line 15 which is shown projecting upwardly from the crock 11 is connected to a source of air under pressure. Some suitable means may be located along this line 15 to regulate the pressure under which the solution in the crock 11 might be placed from time to time. The line 18 connects the two crocks 11 and 17 through the check valve 19. The line 16 projecting upwardly from the crock 17 is connected to a source of air under pressure. Some suitable pressure regulating mechanism is located on this line 16 to regulate the pressure under which the solution in the crock 17 may be placed. Air pressure through line 15 is utilized to force the solution which accumulates in crock 11 over into crock 17, whereas air pressure through line 16 is utilized to force the solution in crock 17 up through the line 20, and through the valve 21 to coat the bulb 25.

In operation, the bulb 25 is brought into register with the valve 21, the neck of the bulb being placed up within the collar 22. The valve is then actuated by some suitable means, such as that shown in the co-pending application Serial No. 409,497, filed September 4, 1941, for example, thereby releasing the coating solution under pressure to flow down the inside walls of the bulb. When the bulb has been thusly coated it is suspended through suitable clips on the frame formed by the uprights 23 and the cross base 24. It is here that the major portion of the drainage occurs, the solution running off into the tank 13 mounted therebelow. Since the drainage at this point occurs almost immediately on the application of the coating solution to the bulbs, the solvent thereof has no appreciable time to evaporate and hence, there is no perceptible change in viscosity. This being so, the drainage which is collected in the tank 13 is directed back through the line 12 directly into the crock 11, the addition of a solvent to enable the regaining of original viscosity being unnecessary. The bulbs, after the major portion of the drainage has taken place, are removed from the rack and placed in trays in the drying tunnel 8 where further drainage takes place. When the coating has dried completely the bulbs are removed from the further end of the tunnel.

Since there is always a certain amount of coating solution draining from the bulb during the entire time that the coating is drying it is desirable also to reclaim this drainage. This is accomplished by causing the drainage to collect and pass through the line 7 into the filter 4. However, since the drainage which occurs in the tunnel is not a single gush of solution from the bulb but rather an intermittent dripping during the entire drying period, the viscosity of the drainage at various stages thereof is different. If this drainage were conducted back for immediate re-use and mixed with the original solution, it would cause a change in the viscosity of the entire batch of coating solution. Since viscosity is a critical factor in coating and drying this condition should be avoided. I have, therefore, devised a method whereby the drainage from the tunnel will have a sufficient amount of solvent added thereto to make up for what has evaporated and automatically give the drainage a viscosity substantially the same as the original coating solution. This being accomplished, the drainage can be conducted back for re-use and mixture with unused coating solution without causing any substantial change in the uniformity of the coating solution viscosity.

Thus, I have found, for example, in the case of the conventional T12 bulbs used in making 40-watt fluorescent lamps that when they are coated at such a speed that a coated bulb will move through the tunnel at the rate of about 14 feet every 15 minutes, approximately 5 gallons of drainage per hour is drawn from the tunnel. To correct the viscosity of this drainage to what it was originally in order to permit its direct mixture with new coating solution, I have found that approximately 900 cc. per hour of solvent, such as pent-acetate for example if that was the solvent originally used, must be added. This is accomplished by causing the solvent in the container 1 to continuously flow therefrom through the line 3 into the drainage as it flows through the line 7 into the filter 4.

Although I have illustrated my invention by a specific reference to a particular size of bulb coated with a solution of luminescent material and passing through the drying area at a particular speed, it must be readily understood that this principle may be adapted to other sizes of coated bulbs, passing through the drying area at different speeds without departing from the spirit of this invention. Similarly, the solvent used may well be other than pent-acetate, such as, for example, xylol.

Thus, for example, I have found that when 100 watt-T17 coated bulbs are moved through the drying area at the rate of about 24 inches per 8 minutes, about 600 cc. of the solvent per hour should be added to the drainage to correct the viscosity thereof. When 15 watt-T8 coated bulbs are moved through the drying area at the rate of about one inch per minute, about 900 cc. of the solvent should be added.

A further factor to be considered is the temperature which is maintained in the drying area, i. e., the drying tunnel in this particular case. The example which I have cited is applicable when the temperature is maintained at about 18° C. to 22° C.

When the level of the coating solution in crock 17 becomes low, the valving means on line 15 referred to above is utilized to increase the pressure on the solution in crock 11 sufficiently to close the check valves 14 and 10 and force the coating solution in crock 11 through the line 18 into the main coating solution crock 17, thereby automatically providing the bulb coating operator with an added supply of coating solution.

The re-use of the drainage with corrected viscosity may be further facilitated by providing line 9, which extends from the filter, with two outlets, one into crock 11 as shown, and another into crock 17. A similar arrangement may be worked out with respect to line 12, whereby it would have an outlet into crock 17 as well as into crock 11. By then providing an additional line 20, this one, extending up from crock 11, could be utilized as an auxiliary so that as soon as the level of solution in crock 17 became too low, valving means could be utilized to then draw from crock 11 through the new line 20 to coat the bulbs. This system would eliminate the necessity of transferring the drainage from crock 11 to crock 17.

What I claim is:

In a method of coating the inner walls of tubular glass articles with a suspension of luminous material containing relatively highly volatile solvents; the method of recovering substantially all of the drainage from the coating operation and maintaining the viscosity thereof substantially constant in an uninterrupted sequence of operations, comprising the steps of positioning the tubes substantially vertical, flowing upon each tube a quantity of the suspension substantially great compared to that required to coat the tube upon the tube walls near their upper ends from a body of mother liquid, permitting the suspension to flow down along the tube walls, collecting the initial immediate drainage from the tubes and continuously returning it to said body of mother liquid, passing a succession of tubes thus treated through a drying area at a predetermined rate of speed, collecting the drainage from the tubes while they are passing through said drying area, determining the loss of solvent in this drainage due to evaporation during passage of the tubes through the drying area, continuously adding new solvent to this drainage at a rate based on the determined loss of solvent thereby to maintain the viscosity of the drainage substantially equal to the mother liquid and continuously returning the restored drainage to the body of mother liquid.

ALFRED J. DONOVAN.

REFERENCES CITED

The following references are of record in the file of this patent:

UNITED STATES PATENTS

| Number | Name | Date |
|---|---|---|
| 1,864,674 | Schur | June 28, 1932 |
| 1,920,191 | Ford | Aug. 1, 1933 |
| 2,086,514 | Saunders | July 6, 1937 |
| 2,096,416 | Weinhart | Oct. 19, 1937 |
| 2,179,288 | Frech | Nov. 7, 1939 |